Patented Jan. 3, 1950

2,493,572

UNITED STATES PATENT OFFICE 2,493,572

DIBENZYLIDENE ANHYDRO-ENNEAHEPTITOL

Otis C. Dermer, Stillwater, Okla., assignor to Cities Service Oil Company, Bartlesville, Okla., a corporation of Delaware No Drawing. Application October 12, 1948, Serial No. 54,200

8 Claims. (Cl. 260—338)

This invention relates to organic compositions and more particularly to dibenzylidene anhydroenneaheptitol, a new composition of matter.

I have discovered that the dibenzylidene derivative of anhydroenneaheptitol may be prepared by reacting benzaldehyde with anhydroenneaheptitol in acid solution, and that a substantially pure dibenzylidene derivative may be produced using both crude and refined anhydroenneaheptitol or diacetone anhydroenneaheptitol as the starting material.

I prepare my new composition of matter by reacting crude or refined anhydroenneaheptitol, or derivatives thereof, dissolved in concentrated hydrochloric acid, with benzaldehyde, the reaction mixture then being allowed to stand for a sufficient length of time to allow the crude product to crystallize out.

In order to speed crystallization, the reaction may be carried out at temperatures as low as 0° C., although this low temperature is not necessary since the reaction proceeds satisfactorily at room temperatures or higher.

The solid derivative, having a melting point of about 227 to 234° C., which crystallizes from the mother liquid of the reaction mixture is in an impure state and must be purified by recrystallization. I have found that solvents from which the product may be recrystallized include nitrobenzene, benzaldehyde, normal butyl alcohol, ortho dichlorobenzene, or pyridine. Of these solvents I have found that pyridine gives the best results and that the purified compound, having a sharp melting point, may be obtained after only one or two recrystallizations from pyridine as compared to multiple recrystallizations necessary from the other solvents mentioned. By successive recrystallizations both from ortho dichlorobenzene and from pyridine a substantially pure material was obtained which melted sharply at 310° C. This product is a white crystalline solid at normal temperatures.

In order that those skilled in the art may more fully understand the nature of my process for producing dibenzylidene anhydroenneaheptitol the following examples are given.

Example I

About 10 grams of anhydroenneaheptitol were dissolved in 20 mls. of concentrated hydrochloric acid, cooled to 0° C., treated with 10 mls. of benzaldehyde, and let stand in the icebox over night. After standing it was found that a quantity of crystalline matter had settled out. This solid derivative was washed with water, dilute alcohol, and a little ether, dried, and recrystallized once from benzaldehyde. The material thus obtained melted at about 227 to 228° C. I have found that if the material is recrystallized from nitrobenzene that a material is obtained melting at about 230 to 234° C.

This crude material may be purified by recrystallization from ortho dichlorobenzene through five or six stages of recrystallization to give a product having a melting point of 310° C., where slight decomposition occurred, or may be purified through only one or two stages of recrystallization from pyridine to give a purified product also melting at 310° C.

For analysis 0.1 to 0.5 gram samples were refluxed for an hour with 5 to 25 mls. of glacial acetic acid and 40 to 200 mls. of 0.5 per cent dinitrophenylhydrazine in hydrochloric acid by the procedure of Angyal and Lawlor (Jour. Amer. Chem. Soc. 66, 837 (1944)). The phenylhydrazone precipitated during the reaction was washed, dried, and weighed. The hydrazone thus obtained indicated a 44.5 benzylidene content for the dibenzylidene anhydroenneaheptitol. The theoretical benzylidene content for

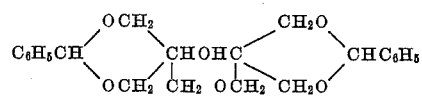

of molecular weight 398 is 42.5 per cent benzylidene.

Carbon and hydrogen analyses were run of the material, which gave carbon observed as 69.43 per cent and 69.40 per cent, as compared with theoretical carbon content of 69.33 per cent; and a hydrogen content observed of 6.70 per cent and 6.65 per cent, as compared with a theoretical hydrogen content of 6.58 per cent.

Example II

Dibenzylidene anhydroenneaheptitol may be produced by reacting benzaldehyde with anhydroenneaheptitol diacetone. Thus 30.2 grams of the known diacetone compound of anhydroenneaheptitol (diisopropylidene anhydroenneaheptitol) was dissolved in concentrated hydrochloric acid and 21.2 grams of benzaldehyde was added with good shaking. The crude dibenzylidene compound, which crystallized out within one hour, was isolated by filtration, washed with water and then ethanol, and dried. After recrystallization, a product identical with that of Example I was obtained.

This new compound, dibenzylidene anhydroenneaheptitol is useful as an intermediate in organic syntheses and is also useful as an analytical aid in the determination of the anhydroenneaheptitol content of crude hydroxy sirups, since benzaldehyde apparently reacts more completely with the anhydroenneaheptitol present than does acetone.

Having now described my invention, what is claimed is:

1. Dibenzylidene anhydroenneaheptitol.
2. The method of synthesizing dibenzylidene anhydroenneaheptitol comprising reacting anhydroenneaheptitol in concentrated hydrochloric acid with benzaldehyde.
3. The method of claim 2 including recrystallizing the product of claim 2 from a solvent selected from the group comprising nitrobenzene, benzaldehyde, normal butyl alcohol, ortho dichlorobenzene, and pyridine, and recovering a substantially pure dibenzylidene anhydroenneaheptitol.
4. The method of claim 3 in which the solvent is pyridine.
5. The method of synthesizing dibenzylidene anhydroenneaheptitol comprising reacting diisopropylidene anhydroenneaheptitol in concentrated hydrochloric acid solution with benzaldehyde.
6. The method of claim 5 including recrystallizing the product of claim 5 from a solvent selected from the group comprising nitrobenzene, benzaldehyde, normal butyl alcohol, ortho dichlorobenzene, and pyridine, and recovering a substantially pure dibenzylidene anhydroenneaheptitol.
7. The method of claim 6 in which the solvent is pyridine.
8. The method of synthesizing dibenzylidene anhydroenneaheptitol comprising reacting benzaldehyde with a compound selected from the group comprising anhydroenneaheptitol and diisopropylidene anhydroenneaheptitol in concentrated hydrochloric acid.

OTIS C. DERMER.

REFERENCES CITED

The following references are of record in the file of this patent:

UNITED STATES PATENTS

| Number | Name | Date |
|---|---|---|
| 2,223,421 | Hubacher | Dec. 3, 1940 |

OTHER REFERENCES

Mannich et al., Berichte, 55B (1922), pages 3155–7.